(12) United States Patent
Lee et al.

(10) Patent No.: US 8,979,316 B2
(45) Date of Patent: *Mar. 17, 2015

(54) ZOOM SPOTLIGHT USING LED ARRAY

(75) Inventors: Jeffrey B. Lee, El Sobrante, CA (US); Brian I-Yuan Chiang, El Sobrante, CA (US); Han-Kun Ho, El Sobrante, CA (US)

(73) Assignee: DiCon Fiberoptics Inc., Richmond, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/216,085

(22) Filed: Aug. 23, 2011

(65) Prior Publication Data

US 2012/0287621 A1    Nov. 15, 2012

Related U.S. Application Data

(60) Provisional application No. 61/485,039, filed on May 11, 2011.

(51) Int. Cl.
*F21V 14/06* (2006.01)
*F21V 5/00* (2006.01)
(Continued)

(52) U.S. Cl.
CPC ............ *F21V 14/06* (2013.01); *F21V 5/002* (2013.01); *F21V 5/008* (2013.01); *F21V 5/04* (2013.01);
(Continued)

(58) Field of Classification Search
CPC ........... F21V 5/007; F21V 5/008; F21V 5/04; F21V 5/041; F21V 5/002; F21V 14/06; F21V 13/12; F21V 13/14; F21V 13/04; F21V 11/08

USPC ............ 362/249.02, 311.02, 800, 268, 306, 362/307, 310, 372, 373, 331, 355
See application file for complete search history.

(56) References Cited

U.S. PATENT DOCUMENTS 4,519,020 A    5/1985 Little
4,739,456 A *  4/1988 Little ........................... 362/268
(Continued)

OTHER PUBLICATIONS

Notice of Allowance and Fees Due for U.S. Appl. No. 13/023,445 mailed Aug. 6, 2013, 9 pages.
(Continued)

*Primary Examiner* — Sharon Payne
*Assistant Examiner* — Kenny C Sokolowski
(74) *Attorney, Agent, or Firm* — Davis Wright Tremaine LLP

(57) ABSTRACT

A LED array spot illuminator for providing light along an optical axis comprises a substrate and at least one array of multiple LED chips without individual packaging supported by the substrate, wherein the LED chips emit light within the same or different wavelength ranges and are distributed laterally with respect to the axis over a light-emitting area. The LED chips have light emitting surfaces for emitting light in directions transverse to the area. An optical device collects and directs light emitted by the LED chips of the at least one array along the axis. An aperture passes the light emitted by the LED chips of the at least one array along the axis, wherein light collected by the optical device and passed by the aperture forms a beam of light illuminating a spot. Electric current is supplied to the multiple LED chips, causing them to emit light. Light emitted by the multiple LED chips that passed through the optical device and the aperture form a beam of light illuminating a spot. A distance between the multiple LED chips and one or more elements of the optical device is controlled to select a size of the spot.

31 Claims, 18 Drawing Sheets

(51) Int. Cl.
*F21V 5/04* (2006.01)
*F21V 11/16* (2006.01)
*F21V 13/12* (2006.01)
*F21V 23/04* (2006.01)
*H05B 33/08* (2006.01)
*G02B 19/00* (2006.01)
*F21W 131/406* (2006.01)
*F21Y 105/00* (2006.01)
*F21Y 113/00* (2006.01)
*F21Y 101/02* (2006.01)

(52) U.S. Cl.
CPC ............... *F21V 11/16* (2013.01); *F21V 13/12* (2013.01); *F21V 23/04* (2013.01); *H05B 33/0842* (2013.01); *G02B 19/0066* (2013.01); *G02B 19/0028* (2013.01); *F21W 2131/406* (2013.01); *F21Y 2105/001* (2013.01); *F21Y 2113/005* (2013.01); *F21Y 2101/02* (2013.01)
USPC ........... 362/268; 362/331; 362/375; 362/307; 362/310

(56) References Cited

U.S. PATENT DOCUMENTS

| | | | | |
|---|---|---|---|---|
| 4,843,528 | A * | 6/1989 | Pearce-Harvey et al. | 362/277 |
| 5,012,609 | A | 5/1991 | Ignatius et al. | |
| 5,165,778 | A | 11/1992 | Matthias et al. | |
| 5,235,499 | A * | 8/1993 | Bertenshaw | 362/297 |
| 5,715,040 | A * | 2/1998 | Iba | 355/67 |
| 6,092,914 | A * | 7/2000 | Esakoff et al. | 362/268 |
| 6,504,301 | B1 | 1/2003 | Lowery | |
| 6,554,450 | B2 | 4/2003 | Fang et al. | |
| 6,659,622 | B2 | 12/2003 | Katogi et al. | |
| 6,809,347 | B2 | 10/2004 | Tasch et al. | |
| 6,860,619 | B2 | 3/2005 | Swanson | |
| 6,866,401 | B2 | 3/2005 | Sommers et al. | |
| 6,921,182 | B2 | 7/2005 | Anderson et al. | |
| 7,140,751 | B2 | 11/2006 | Lin | |
| 7,173,383 | B2 | 2/2007 | Vornsand et al. | |
| 7,192,162 | B2 * | 3/2007 | Tanaka et al. | 362/268 |
| 7,220,018 | B2 | 5/2007 | Crabb et al. | |
| 7,261,438 | B2 * | 8/2007 | Alessio | 362/268 |
| 7,295,379 | B2 * | 11/2007 | Tsai | 359/651 |
| 7,543,952 | B1 | 6/2009 | Chang | |
| 7,549,772 | B2 | 6/2009 | Wang | |
| 7,670,030 | B2 * | 3/2010 | Klipstein | 362/304 |
| 7,676,915 | B2 | 3/2010 | Ter-Hovhannissian | |
| 7,722,211 | B2 | 5/2010 | Marra et al. | |
| 7,771,088 | B2 | 8/2010 | Chen | |
| 7,893,445 | B2 | 2/2011 | van de Ven et al. | |
| 8,038,319 | B2 | 10/2011 | Bailey | |
| 8,044,427 | B2 | 10/2011 | Su et al. | |
| 8,047,684 | B2 * | 11/2011 | Chang | 362/268 |
| 8,057,060 | B2 | 11/2011 | fredricks | |
| 8,508,127 | B2 * | 8/2013 | Negley et al. | 313/512 |
| 8,523,385 | B2 | 9/2013 | Lu et al. | |
| 8,568,009 | B2 | 10/2013 | Chiang et al. | |
| 8,596,815 | B2 | 12/2013 | Lee et al. | |
| 2005/0152146 | A1 * | 7/2005 | Owen et al. | 362/294 |
| 2005/0237747 | A1 * | 10/2005 | Shimizu et al. | 362/294 |
| 2007/0058368 | A1 | 3/2007 | Partee et al. | |
| 2007/0253196 | A1 | 11/2007 | Ormiston | |
| 2008/0218995 | A1 | 9/2008 | Gilkey et al. | |
| 2009/0080184 | A1 * | 3/2009 | Kobilke | 362/227 |
| 2009/0190363 | A1 | 7/2009 | McDonnell et al. | |
| 2009/0201577 | A1 | 8/2009 | LaPlante et al. | |
| 2009/0288340 | A1 | 11/2009 | Hess | |
| 2009/0315062 | A1 | 12/2009 | Su et al. | |
| 2010/0033970 | A1 * | 2/2010 | Jetter et al. | 362/268 |
| 2010/0188018 | A1 * | 7/2010 | Salm | 315/294 |
| 2011/0050126 | A1 | 3/2011 | Wang et al. | |
| 2012/0044713 | A1 | 2/2012 | Chiang et al. | |

OTHER PUBLICATIONS

Koninklijke Philips Electronics N.V., "Intellectual Property & Standards, Licensing Programs, LED-based Luminairies and Retrofit Bulbs", Nov. 11, 2010; www.ip.philips.com/services, 2 pages.
Koninklijke Philips Electronics N.V., "Philips Color Kinetics Core LED Lighting Technologies", Nov. 11, 2010; www.colorkinetics.com/technologies/core, 2 pages.
U.S. Office Action for U.S. Appl. No. 12/860,760 mailed Sep. 27, 2012, 21 pages.
U.S. Final Office Action for U.S. Appl. No. 12/860,760 mailed Dec. 17, 2012, 23 pages.
Notice of Allowance and Fees Due for U.S. Appl. No. 12/860,760 mailed Jun. 24, 2013, 9 pages.
U.S. Office Action for U.S. Appl. No. 13/023,445 mailed Mar. 15, 2013, 29 pages.
U.S. Office Action for U.S. Appl. No. 13/088,033 mailed May 22, 2013, 10 pages.
Notice of Allowance and Fees Due for U.S. Appl. No. 13/088,033 mailed Sep. 18, 2013, 13 pages.
Notice of Allowance and Fees Due for U.S. Appl. No. 14/071,334 mailed Dec. 24, 2014, 22 pages.
U.S. Office Action for U.S. Appl. No. 13/756,282 mailed Nov. 20, 2014, 7 pages.

* cited by examiner

POLAR CANDELA DISTRIBUTION PLOT

RECTANGULAR CANDELA DISTRIBUTION PLOT

ZOOM SPOTLIGHT USING LED ARRAY

CROSS REFERENCE TO RELATED APPLICATION

This application claims the benefit of and claims priority to U.S. Provisional Application No. 61/485,039 filed May 11, 2011, which application is incorporated herein in its entirety by this reference.

BACKGROUND

The present invention relates generally to zoom spotlight illuminating apparatuses that provide a spot beam of variable size and beam angle, and specifically to a zoom spotlight apparatus that uses a multiple wavelength light emitting diode (LED) array and its accompanying optical elements.

Spotlights have long been used in a variety of applications where a narrow beam angle is desired or preferable. In theatrical lighting, a spotlight is often used to brightly illuminate a performer or small group of performers on a stage. In photography and other studio applications, a spotlight may be used to brightly illuminate a selected small area. The narrow beam angle of a typical spotlight provides greater light intensity over a small area, compared to a floodlight of similar total light output, but with wider beam angle. Desired attributes of a spotlight include uniform light intensity within the area of illumination, which may also translate to a sharp demarcation between the illuminated and non-illuminated areas. In other words, the beam of the spotlight should have a well-defined boundary, with even illumination within the beam. In addition, the spectral distribution within the beam should be highly uniform, without visible color variation. This includes the avoidance of fringing effects, such as color differences around the perimeter of the spot beam. Additional desirable attributes for some spotlight applications include the ability to vary the color of the spot beam, as well as the ability to vary the color temperature of white light.

Zoom spotlights provide the additional functionality of an adjustable spot beam size, with variable beam angle. At a given distance from the area to be illuminated, a preferred zoom spotlight would provide a usefully wide range of spot beam size, while maintaining a highly uniform intensity of illumination within the beam. The zooming capability is ideally provided without compromising the other attributes of a fixed spotlight.

Prior art zoom spotlights typically make use of some form of incandescent bulb as a light source. High-intensity discharge (HID) bulbs are frequently used, based on their higher luminous efficacy when compared to a tungsten-filament incandescent bulb. Differing types of HID bulbs may be used, depending on the desired light output, correlated color temperature of the light output, color rendering index, bulb lifetime, cost, and other attributes. A desirable attribute of most incandescent and HID bulbs is that their light is emitted from a small area, so that the bulb provides a reasonable approximation of a point source of light. This simplifies the design of the optical elements needed to provide the adjustable spot beam.

The optical elements of a typical prior art zoom spot light may include reflectors, light scramblers or randomizers, apertures, and one or more lenses. The mechanisms for adjusting beam spot size and angle, while maintaining a uniform beam with well-defined boundaries, may involve movement of the bulb within a reflector, varying the size and/or position of an aperture that is placed in front of the bulb, and/or varying the position of one or more lenses that are used to collect the light from the bulb, as well as to focus or collimate the light.

Although bulb-based zoom spotlights are capable of providing a bright, uniform spot beam of varying size and beam angle, the use of incandescent (or HID) bulbs has some significant disadvantages. Incandescent and HID bulbs have a relatively short lifetime, especially at higher levels of light output, and require frequent bulb replacement. Significant heat is generated, and the electrical power requirements are high. For a given type of bulb, the spectral content of the beam is basically fixed, so that external filters are needed to either provide light of a different color, or to modify the color temperature of the light. Such color filters add cost and complexity to the lighting system, and also significantly reduce the efficiency of the light, by filtering out a portion of the bulb's output.

Luminaires based on Light Emitting Diodes (LEDs) are becoming increasingly popular, due to rapid developments in LED technology, and increases in brightness and efficiency. LEDs have multiple advantages as a light source, including high reliability and long lifetime, especially when compared to incandescent bulbs and HID light sources. The cost per Watt of LED light sources is also decreasing rapidly, leading to broader applicability for a wider range of lighting applications. LED light sources are also able to provide multiple colors without the use of external filters or color wheels, including white light of different color temperatures.

However, prior art LED light sources still have significant disadvantages, especially for a zoom spotlight application. The light output of individual LEDs is insufficient for most applications. If the total light output is increased by grouping multiple individually-packaged LEDs, this results in a diffuse, spatially-separated collection of multiple light sources, with difficult optics. In order to form a uniform spot beam, a portion of the optics may need to be replicated for each of the individual LEDs, so that the light output from the multiple LEDs can be combined into a single, uniform spot beam.

The present invention's densely-packed array of LED chips addresses the disadvantages of prior art LED spotlights, while providing the general advantages of LED technology. The densely-packed LED array provides the light output of large numbers of LED chips, rivaling the light output of incandescent bulbs and HID lighting, while retaining the high reliability and long lifetime advantages of LEDs. Similar to many incandescent bulbs, the densely-packed LED array approximates a point source of light, acting as an "extended point source".

The extended point source nature of the present invention's densely-packed LED array provides significant advantages to the application of zoom spotlights. A single set of optical elements can be used to direct the light output of the entire LED array, making it easier to form a uniform spot beam, with adjustable size and beam angle. The zoom spotlight optics can be largely based on prior art practice from zoom spotlights that use incandescent bulbs, with some variations. This greatly reduces the cost and complexity of the optical elements, compared to prior art LED zoom spotlights. The use of the densely-packed LED array, using LED chips of multiple wavelengths, also provides dynamic color-mixing capability, including the ability to vary the color temperature of white light. This can be accomplished using arrays containing red, green, blue, and sometimes amber LEDs, or "white" LEDs comprised of blue LED chips that are coated with phosphors that provide broader spectrum yellow and orange light. By avoiding the need for external filters or color wheels, the LED zoom spotlight of the present invention provides a significant advantage over prior art zoom spotlights.

SUMMARY OF THE INVENTION

A LED array spot illuminator for providing light along an optical axis comprises a substrate and at least one array of multiple LED chips without individual packaging supported by the substrate, wherein the LED chips emit light within the same or different wavelength ranges and are distributed laterally with respect to the axis over a light-emitting area. The LED chips have light emitting surfaces for emitting light in directions transverse to the area. An optical device collects and directs light emitted by the LED chips of the at least one array along the axis. An aperture passes the light emitted by the LED chips of the at least one array along the axis, wherein light collected by the optical device and passed by the aperture forms a beam of light illuminating a spot.

To provide light that forms a beam for illuminating a spot, a LED array illuminator is provided that includes a substrate, at least one array of multiple LED chips without individual packaging supported by the substrate, wherein the LED chips emit light within the same or different wavelength ranges. Electric current is supplied to the multiple LED chips, causing them to emit light. Light emitted by the multiple LED chips is passed through an aperture and an optical device, so that light emitted by the multiple LED chips that passed through the optical device and the aperture form a beam of light illuminating a spot. A distance between the multiple LED chips and one or more elements of the optical device is controlled to select a size of the spot.

BRIEF DESCRIPTION OF THE DRAWINGS

FIGS. 5A and 5B show the spatial light distribution of one embodiment of the LED array used in the present invention, using polar coordinates and rectangular coordinates, without the additional optical elements.

DETAILED DESCRIPTIONS OF THE PREFERRED EMBODIMENTS

In one embodiment, a compact multiple wavelength LED array with accompanying optical elements that outputs intense light uniformly over a field of view. The LED array of this embodiment contains multiple strings consisting of several LED chips of different wavelength and each string is controlled electronically as a separate channel. The multiple channels allow for each string of LEDs and hence output color and power to be rapidly switched on/off and varied, respectively. This provides for dynamic color mixing and color changing, including the ability to vary the color temperature of white light. The optical elements immediately succeeding the LED array serve to collect and reshape the output light to enhance both light coupling efficiency and uniformity, and to adjust the size of the resulting spot beam over a wide range of adjustment. A lens attached to the surface of the LED array enhances light extraction followed by a light scrambler or randomizer which acts to spatially homogenize the beam. Surrounding the array and the light scrambler is a reflector which serves to partially collimate the light. An aperture, located at the end of the reflector element, is used to cut off undesired light, and is followed by a plano-convex lens which is used to collect the light that passes the aperture. The position of this collector lens can be varied along the optical axis. The light then passes a focusing or collimating convex lens. The position of this focusing lens can be adjusted over a wide range of adjustment, along the optical axis, serving as the primary adjustment mechanism for the size of the resulting spot beam.

It will be understood, however, that not all of the above features need to be adopted to achieve many of the advantages described above. For example, the LED chips may emit light of the same or similar color, and for some applications, a light scrambler or randomizer may not be needed. Also, other embodiments may use additional optical elements, in order to achieve greater zooming range or magnification.

Figure 1:
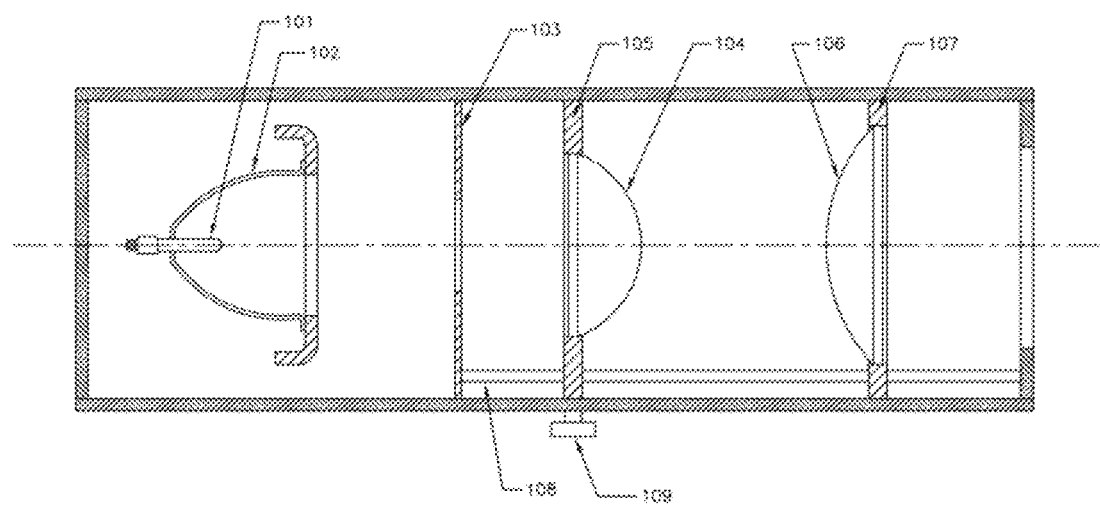
FIG. 1 is a cut-away representation of the prior art of a typical zoom spotlight, using an incandescent bulb as the light source.

FIG. 1 shows one embodiment of the prior art in zoom spotlights, using an incandescent bulb as the light source. This embodiment is based on U.S. Pat. No. 4,519,020, "VARIABLE MAGNIFICATION STAGE LIGHT", issued to William D. Little on May. 21, 1985. In FIG. 1, a bulb (101) is mounted within a reflector (102), typically with a parabolic shape, to direct the majority of the light output toward the other optical elements. The need for this reflector element is particularly great when using an incandescent bulb or HID lamp as a light source, as the light from the bulb is emitted in all directions. An aperture (103) is used to create a sharp boundary for the beam. Note that in other embodiments of zoom spotlights, an aperture of adjustable size may also play a role in adjusting the size and beam angle of the resulting spot beam. However the embodiment shown in FIG. 1 uses a fixed aperture.

In the prior art embodiment of FIG. 1, the shaping and adjustment of the spot beam size and beam angle is accomplished with the use of two lenses, shown as items 104 and 106, and held in place by lens mounts 105 and 107. In this embodiment, the primary adjustment of spot beam size and beam angle is achieved by moving the first lens (104), by sliding its lens mount (105) along an adjustment rail (108). The movable lens is held in place via a knob (109). In other embodiments of the prior art in zoom spotlights, that also use incandescent bulbs or HID lamps, different adjustment mechanisms can be used, to vary the relative positions of one or more lenses, as well as an aperture, along the optical axis of the zoom spotlight, in relation to the light source (bulb) and its reflector, and in relation to each other. In these embodiments, the optical design is based on the assumption that the light source or bulb approximates a point source of light.

Figure 2:
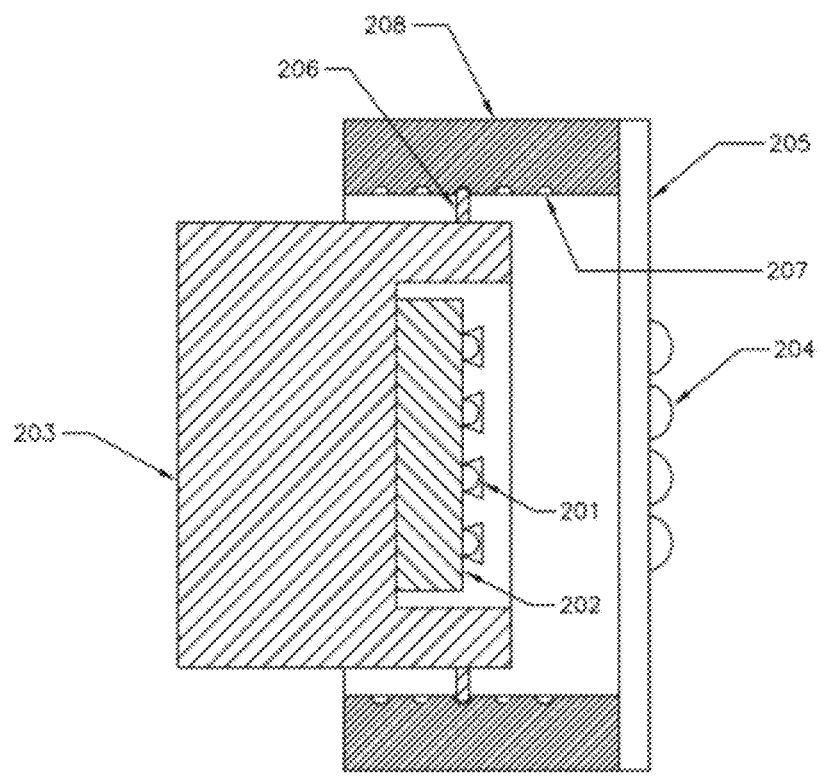
FIG. 2 is a representation of the prior art in LED zoom spot light, using multiple separately packaged LEDs to achieve sufficient light output.

FIG. 2 shows one embodiment of the prior art in LED zoom spotlights, based on U.S. Pat. No. 6,866,401 B2, "ZOOMABLE SPOT MODULE", issued to Sommers, et al. on Mar. 15, 2005. In order to obtain sufficient light output, this embodiment of the prior art uses multiple LEDs (201), each packaged individually with its own primary lens. In some embodiments of this prior art, the individual LED packages will also include a small reflector cup. Due to their individual packaging, these multiple LEDs (201) are mounted on a substrate (202) with a fairly large separation between adjacent LEDs, on the order of 5-10 mm, or more. Typically this substrate would be made of some material with reasonably good thermal conduction properties. In the embodiment shown in FIG. 2, the substrate (202) is in turn mounted onto an LED housing (203).

Due to the spatial separation of the multiple LEDs of the prior art embodiment shown in FIG. 2, multiple collimating or focusing lenses (204) are mounted to a plate (205), so that a lens element (204) is positioned above each of the LEDs (201). The plate (205) is in turn mounted to a lens housing (208). The plate (205) that holds these lenses may be transparent or it may also provide a light scrambling or randomizing function, such as would be provided by a diffuser. In this embodiment, the adjustment of the overall spot beam is done by varying the distance between the lenses and the LEDs. This is accomplished by having some form of threaded mechanism between the lens housing (208) and the LED housing (203), which is represented by the thread shown as item 206 on the LED housing, and the mating thread shown as item 207 on the lens housing. Adjustment of this mechanism allows the distance between the LEDs and the lenses to be varied.

The spatial separation between the LEDs, in the prior art embodiment of FIG. 2, makes it difficult to design effective optics to create a uniform spot beam with adjustable spot beam size and beam angle. Multiple lenses must be used, which adds to the cost and complexity of the optical design. The embodiment of FIG. 2 is relatively simple, but also is only partly effective at mixing the light from the multiple LEDs into a single, uniform spot beam. This represents a significant performance disadvantage, especially when LEDs of multiple wavelengths are being used to allow for dynamic color mixing. Additional optical elements could be added, to achieve a more uniform spot beam. Alternatively, very large lenses, with both large numerical aperture and large diameter, and other optical elements, could be used to collect the combined light output of the multiple, spatially separated LEDs. However, this further adds to the cost and complexity of the optical design. The fact that the widely-spaced, individually packaged LEDs do not behave like a single point source of light represents a major shortcoming of the prior art in LED zoom spotlights. This is especially the case since light emitted by each individual packaged LED has a Gaussian distribution. Because of the spatial separation between the light emitting areas of the individual packaged LEDs, the light emitted from areas between the LED packages tend to have lower intensity than light emitted by other areas, causing uneven illumination within the illuminated spot.

Figure 3A:
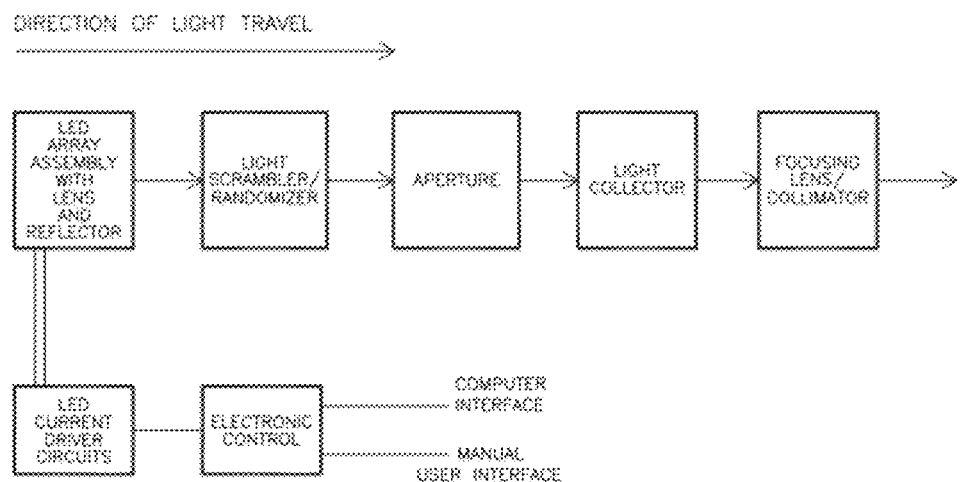
FIG. 3A is a block diagram representation of the present invention and illustrates the different components and their function in the apparatus.
Figure 3B:
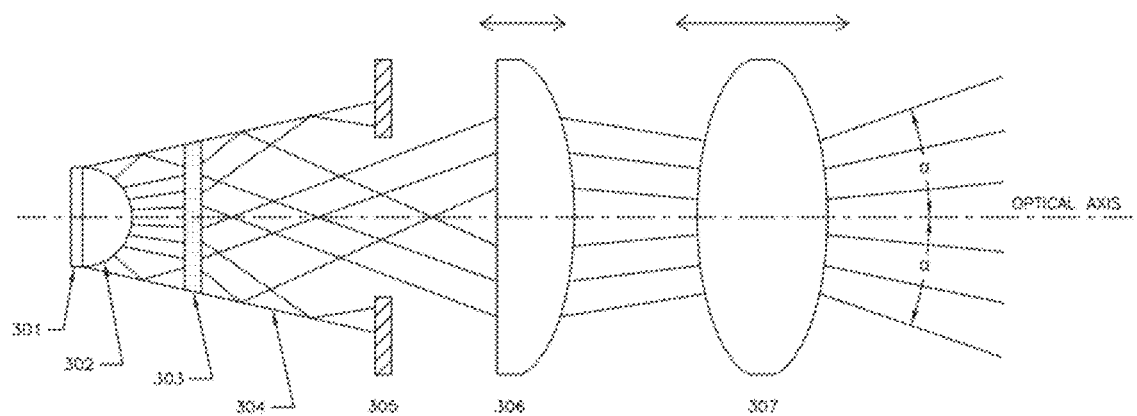
FIG. 3B is a representation of one embodiment of the present invention using a diffuser plate as a light scrambler/randomizer, an aperture, an adjustable plano-convex lens as the light collector lens, and an adjustable convex lens as the focusing/collimating lens.
Figure 4A:
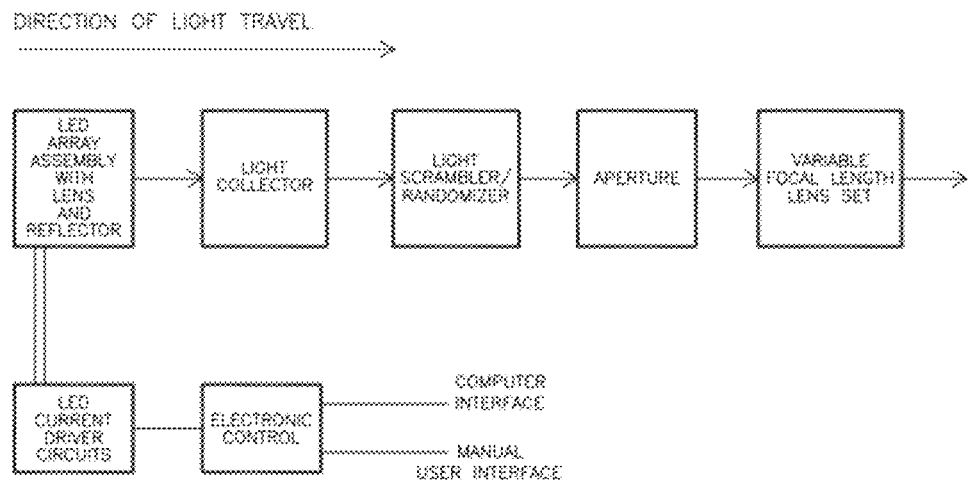
FIG. 4A is a block diagram representation of another embodiment of the present invention.
Figure 4B:
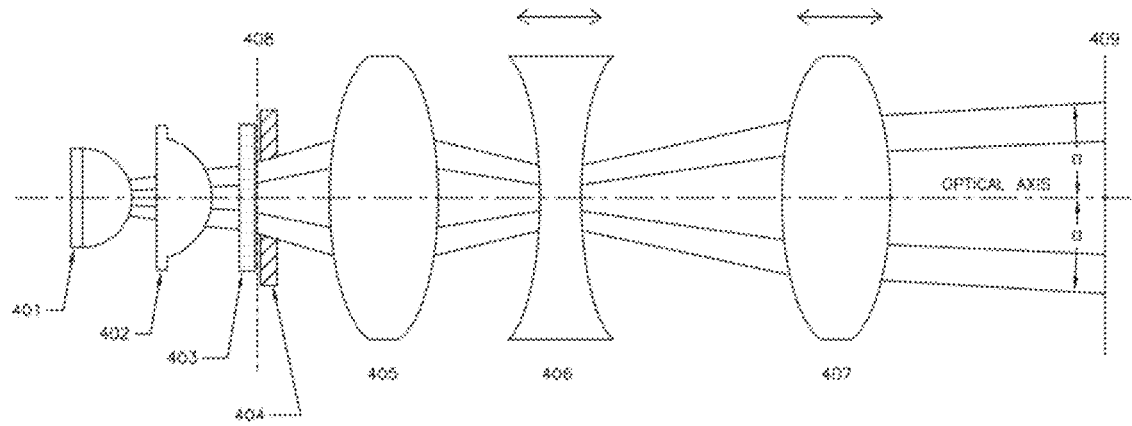
FIG. 4B is a representation of another embodiment of the present invention using an aspherical condenser lens for light collection, a diffuser plate as a light scrambler/randomizer, an aperture, and a 3-lens zoom system (with positive, negative, and positive focal lengths, respectively). The position of two out of the three lenses in the zoom system can be adjusted independently.

The present invention of a multiple wavelength zoom spotlight illumination apparatus uses a densely-packed LED array, comprised of a large number of LED chips of potentially multiple wavelengths, and is both compact and uses far fewer optical elements than the prior art LED illuminators which use spatially separated and individually packaged LEDs. The spacing between adjacent LED chips in this densely-packed array is preferably in a range of 0.05 to 0.2 mm, and more preferably approximately 0.1 mm, in contrast to the 5-10 mm spacing between the individually packaged LEDs of the prior art embodiment shown in FIG. 2. Schematic block diagrams illustrating the major components in the apparatus of two embodiments of the present invention are shown in FIGS. 3A and 4A, with the optical elements of the two embodiments shown in more detail in FIGS. 3B and 4B respectively. The light emitted from the LED chips within the LED array assembly (301 and 401) has a Lambertian distribution. Since the index of refraction of the LED chips is high (approximately 3.4 for GaAs-based LED chips, and approximately 2.3 for GaN-based LED chips), a lens such as a half-ball (or truncated half-ball) lens (302 and shown as attached to item 401) is attached to the top of the LED array (301 and 401) with index matching gel such as silicone filling the space between the LED chips and the half-ball lens, to reduce total reflection at the LED surfaces and improve light extraction. The overall area occupied by LED array (301 and 401) is relatively small; the dimensions of this area are typically in the range of 8-15 mm, and are less than 25 mm even with as many as 100 LED chips, results in the LED array approximating the behavior of a point source of light, as an "extended point source." Where the LED array (301 and 401) occupies a circular area, this area has a diameter that does not exceed 25 mm. The overall dimensions of the embodiments of the present invention that are shown in FIGS. 3B and 4B (and in subsequent figures) are comparable to the overall dimensions of the incandescent (or HID) bulb-based prior art embodiment of FIG. 1. The overall length of the optical path shown in FIGS. 3B and 4B would typically be in the range of 6 to 12 inches (150 to 300 mm), depending on the desired spot size of the beam and the zoom/magnification range.

In one embodiment of the present invention, as shown in FIGS. 3A and 3B, the diverging light from the LED array and half-ball lens then passes through a light scrambler/randomizer element (303). The light scrambler can be any kind of material that evenly distributes light, for instance by having randomly textured surfaces or imbedded diffractive particles, such as a diffuser. The light scrambler/randomizer element (303) is mounted within a reflector element (304). The combination of the reflector and light scrambler/randomizer serve to create a homogenized beam, with good mixing of the light from the multiple wavelength LED chips within the LED array. At the end or mouth of the reflector, an aperture (305) is used to pass only the most evenly-mixed central area of the beam, and also defines a sharp boundary for the resulting beam. Light that passes through the aperture is immediately collected by a condensing lens (306) of high numerical aperture (and hence a small f-number, preferably of value less than 1.0). A focusing lens/collimator (307) is placed at the end of the light path. Both the condensing lens (306) and the focusing lens (307) are moveable or adjustable along directions (shown as arrows above lenses 306, 307 in FIG. 3) parallel to the optical axis by a known device such as a screw drive (not shown), in order to adjust the size of the spot beam, its beam angle, and to some extent, the degree of sharpness at the border or boundary of the spot beam. Though not described in detail, other kinds of lenses that improve light extraction, collection, and collimation are within the scope of the present invention. FIG. 3B illustrates one embodiment of the present invention in which a plano-convex lens (306) and a double-convex lens (307) are used as the light collector lens and focusing lens/collimator, respectively. The optical elements shown in FIG. 3B are optimized to work with an approximate point source (the extended point source of the densely-packed LED array), with light output that is aligned with the optical axis, and are therefore similar to the optical elements used in prior art zoom spotlight that used incandescent bulbs or HID lamps as their light source.

Another embodiment of the present invention is shown in FIGS. 4A and 4B. Light exiting the LED array assembly (401) with attached half-ball lens is immediately collected by a condenser lens (402) and sent through a light scrambler/randomizer (403). The aperture (404) is used not only to filter light, but also to control of the overall geometry of the illuminated spot. For instance, if the aperture is a circle, the spot will be a circle as well and if the aperture is a square shape, then the image of it on the image plane (409) will also be square shaped. The scrambler/randomizer and aperture are located together on the object plane (408). The portion of the scrambler/randomizer within the aperture is imaged by the 3-lens zoom system (405-407) and magnified onto image plane 409. The effective focal length of the 3-lens zoom system is varied by changing the position along the optical axis of two of the three lenses, such as by moving two of the lenses together or synchronously. Therefore the overall magnification of the light passing through the scrambler/randomizer and aperture from the object plane (408) can be controllably varied—hence a zoom system. The sharpness of the image can also be varied by moving only one optical element (405, 406 or 407) such that the image of the aperture and scrambler/randomizer located on the object plane (408) is in or out of focus at the image plane (409). Edges of the image can be made softer this way by simply moving a lens and changing the location of the image plane.

Figure 5A:
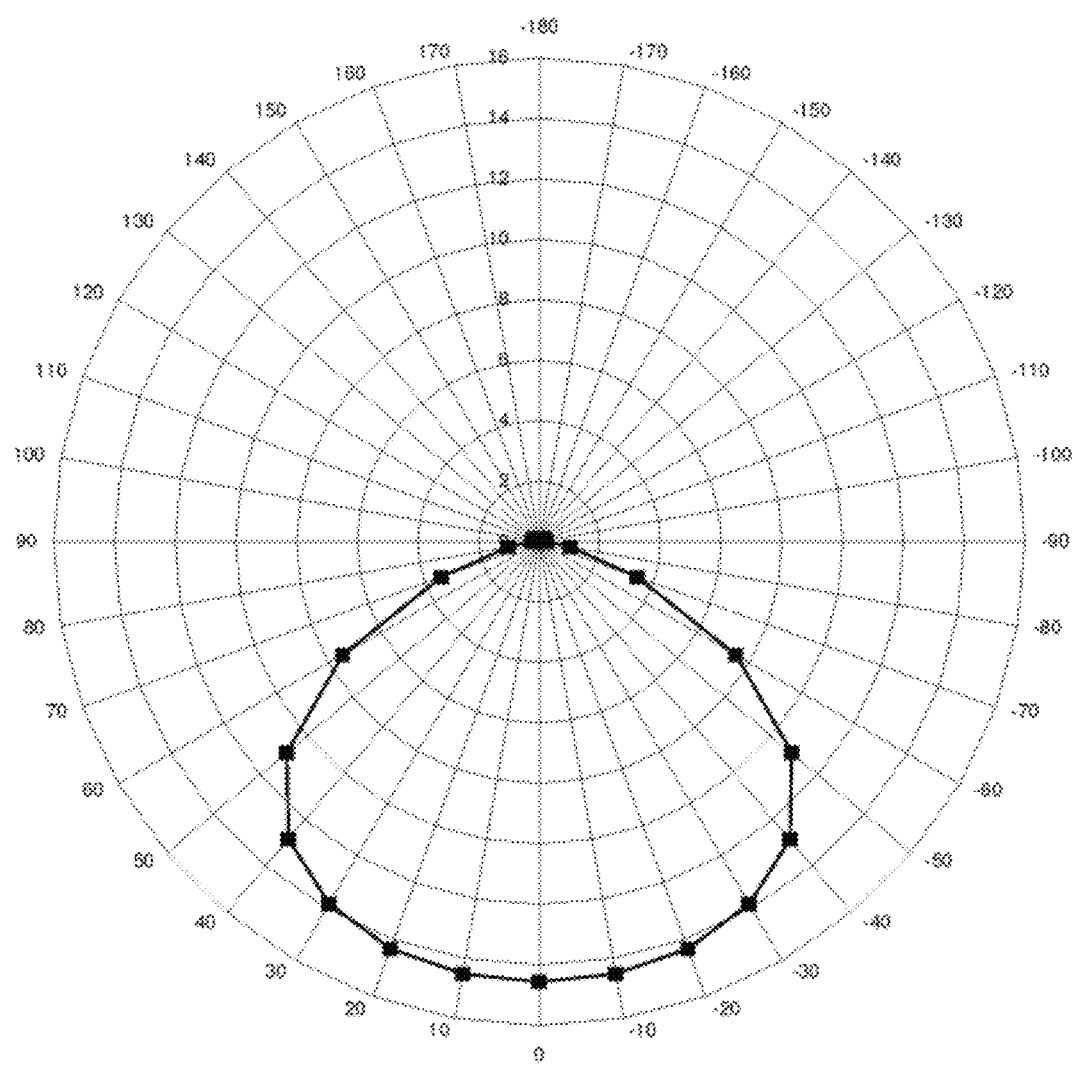

FIGS. 5 and 6 provide simulated results of the spot beam produced by one embodiment of the present invention, with an optical design that is represented by FIGS. 3A and 3B. FIGS. 5A and 5B provide polar coordinate and rectangular coordinate plots of the light intensity distribution of the LED array by itself, with no other optical elements other than the half-ball (or truncated half-ball) lens that is mounted on the array. FIGS. 6A and 6B provide plots of the light intensity distribution of one embodiment of the entire apparatus of the present invention as illustrated in FIGS. 3A and 3B, with the light collector and focusing lenses positioned to produce a relatively wide spot beam. FIGS. 6C and 6D provide plots of the light intensity distribution with the lenses in FIGS. 3A and 3B positioned to produce a narrower, more concentrated spot beam.

Figure 8B:
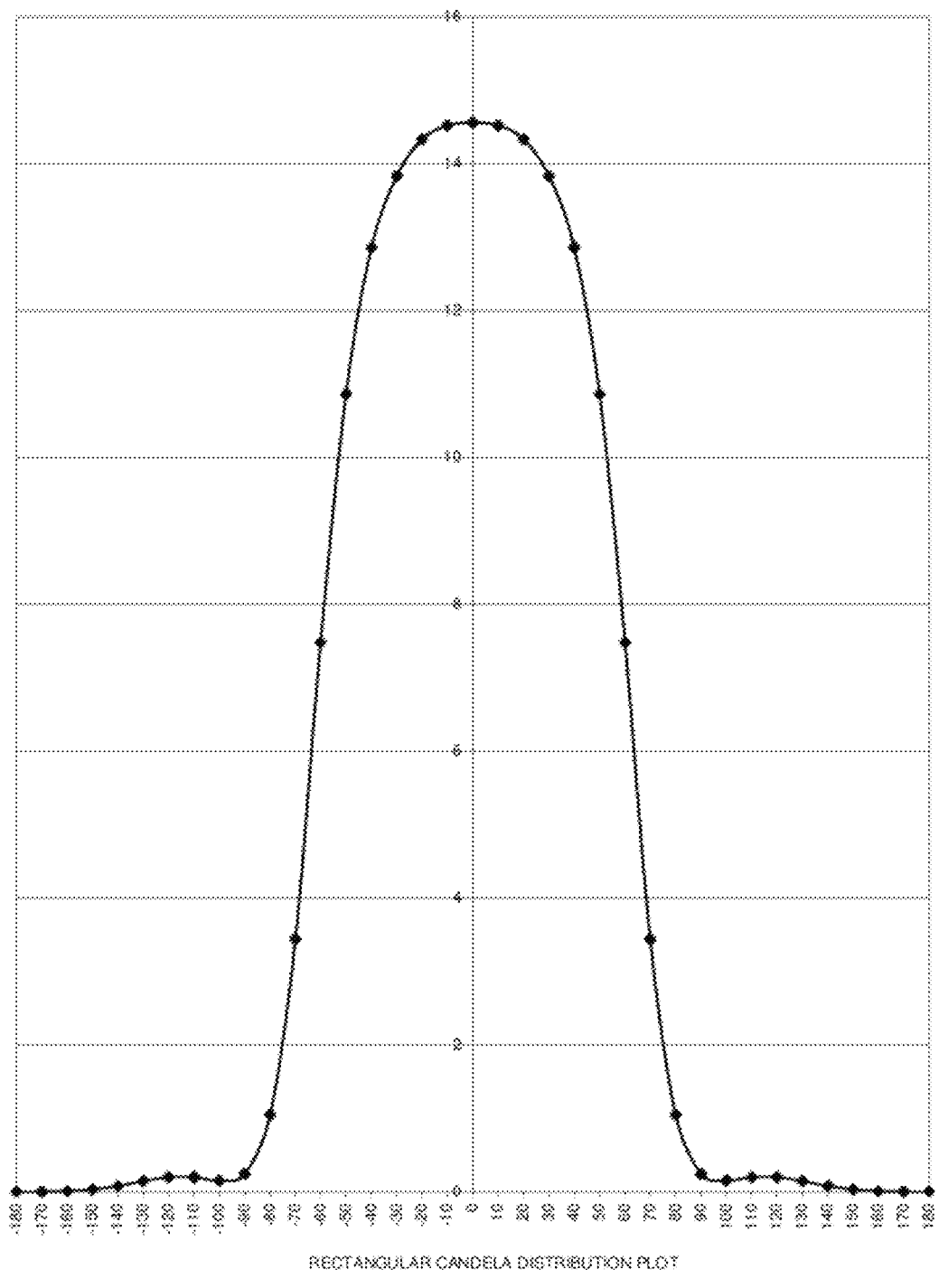
FIGS. 8A and 8B show plots of the uniformity of the spot beams shown in FIGS. 7A and 7B.
Figure 6A:
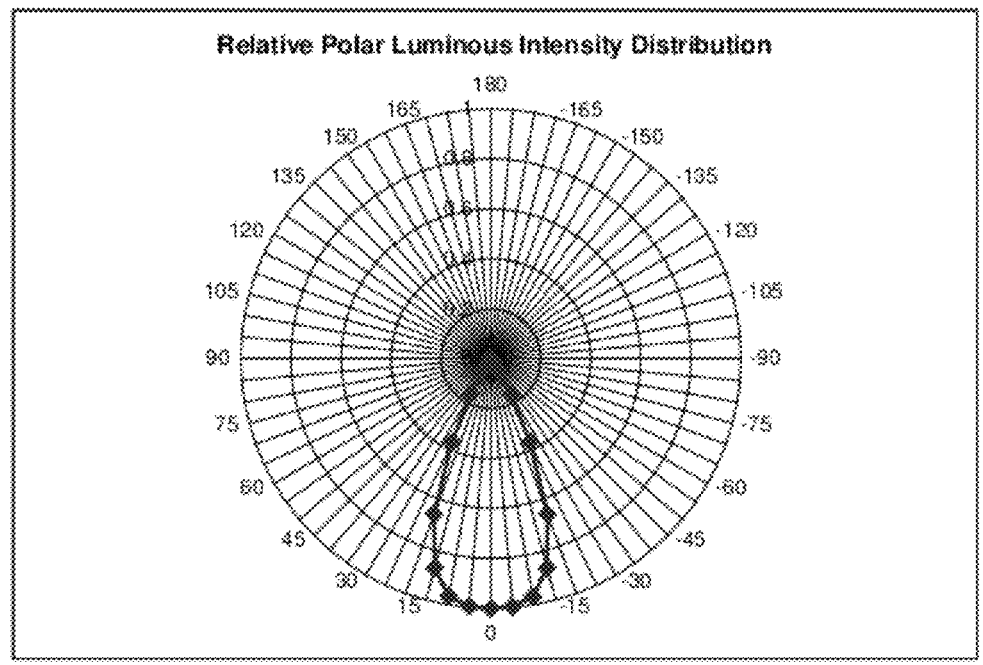
FIGS. 6A and 6B show the spatial light distribution of one embodiment of the present invention, using polar coordinates and rectangular coordinates, with the lens positions adjusted for a maximum spot beam size.
Figure 6B:
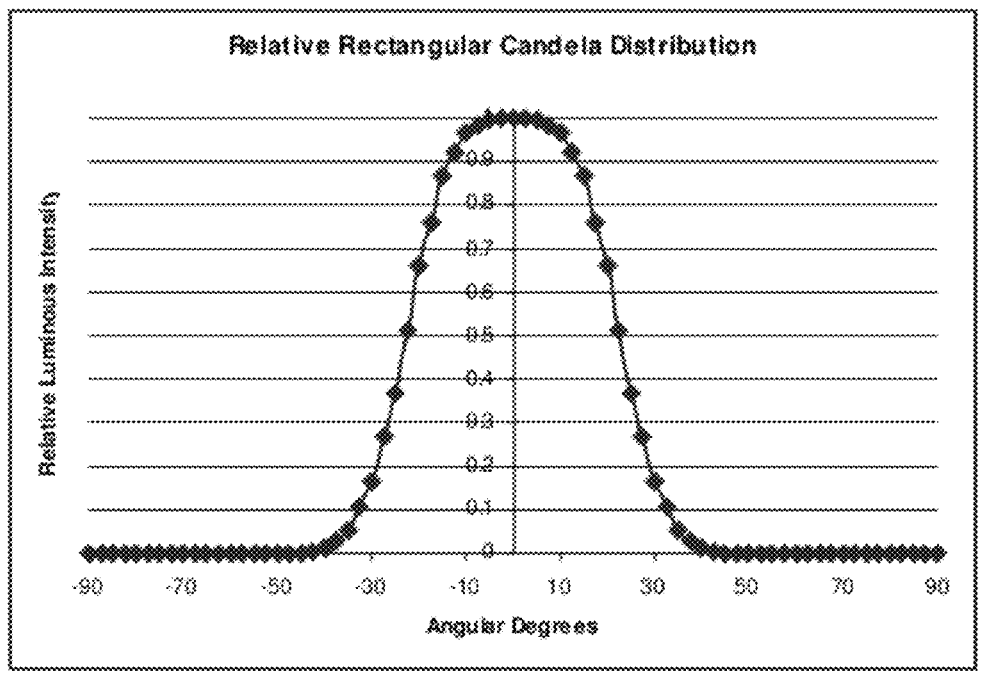
Figure 6C:
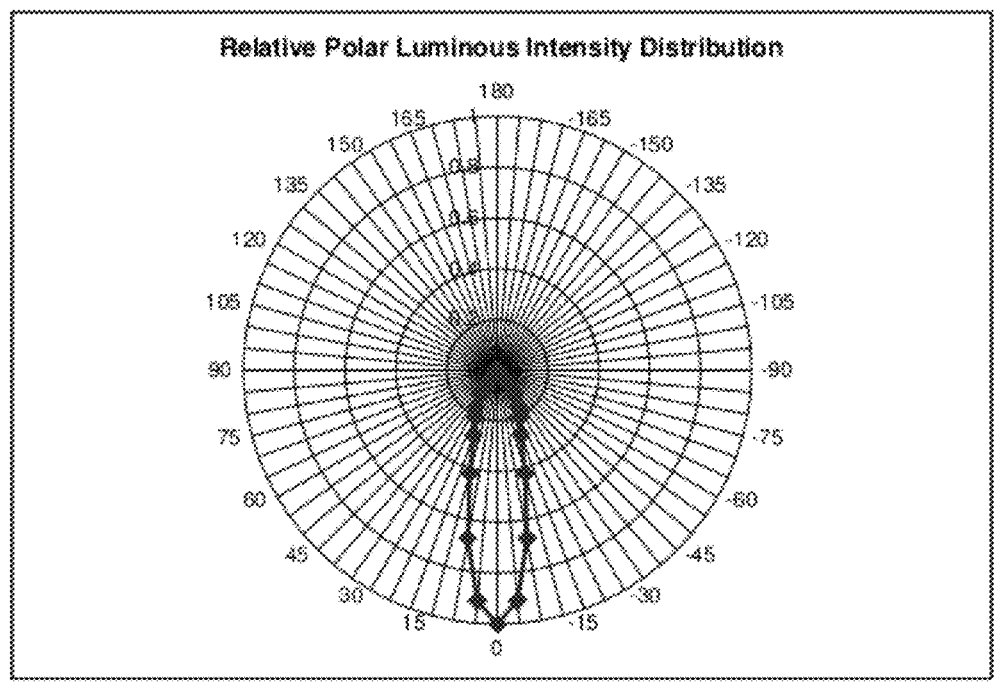
FIGS. 6C and 6D show the spatial light distribution, using polar coordinates and rectangular coordinates, with the lens positions adjusted for a minimum spot beam size.
Figure 6D:
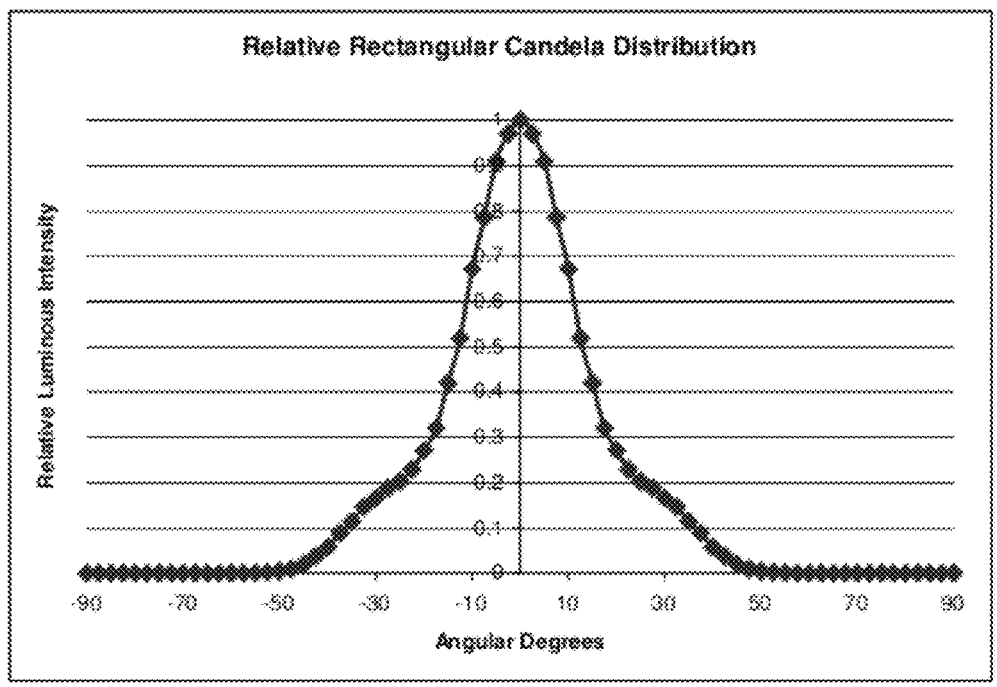
Figure 7A:
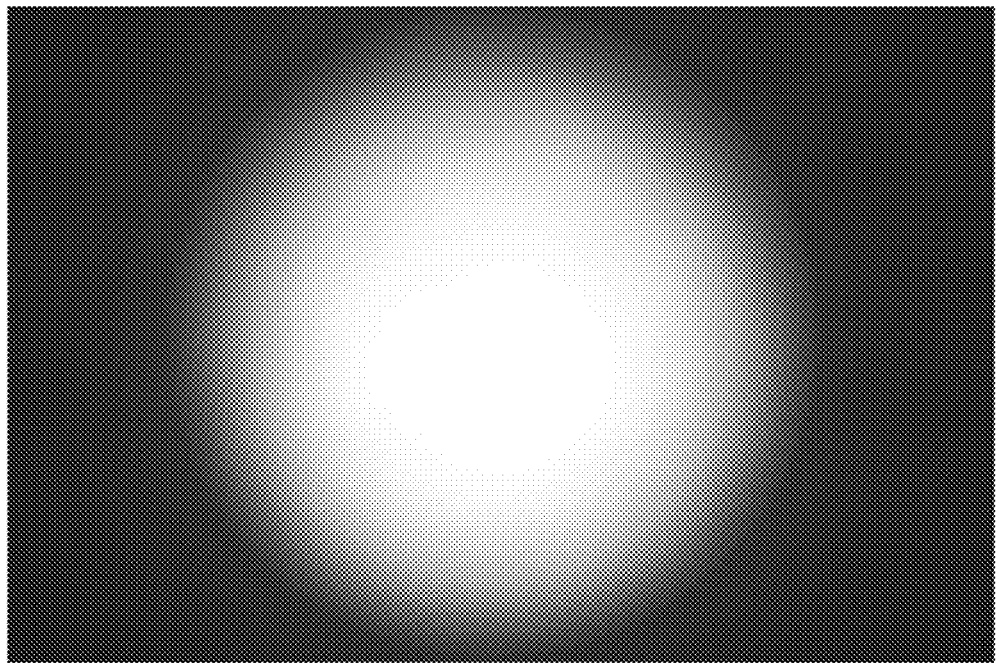
FIGS. 7A and 7B show photographs of the maximum size spot beam and the minimum size spot beam, of one embodiment of the present invention, equipped with an LED array that provides white light using blue LED chips and phosphors.
Figure 7B:
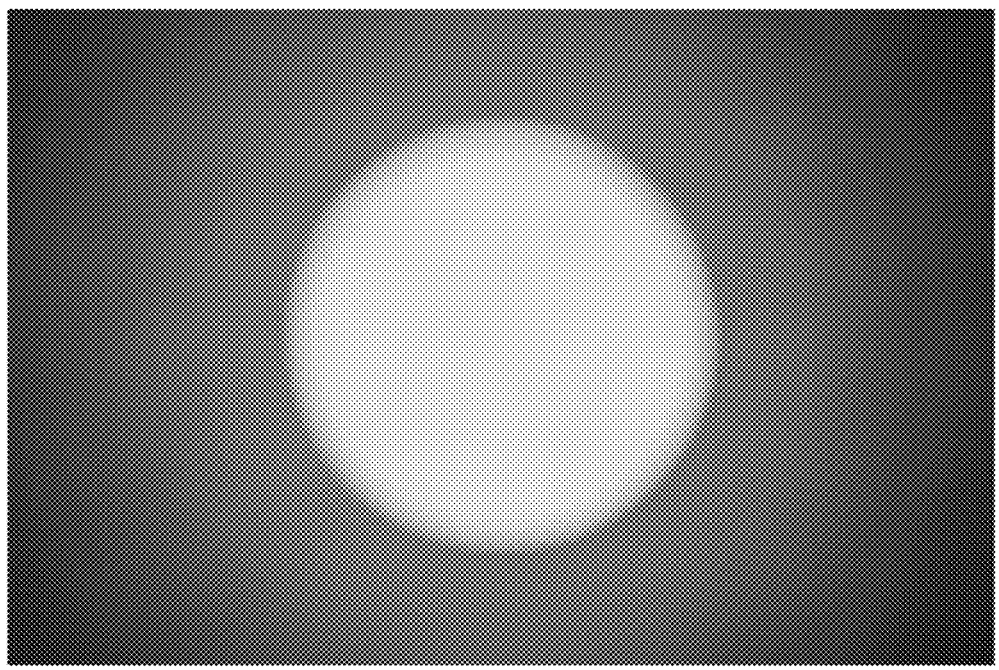
Figure 8A:
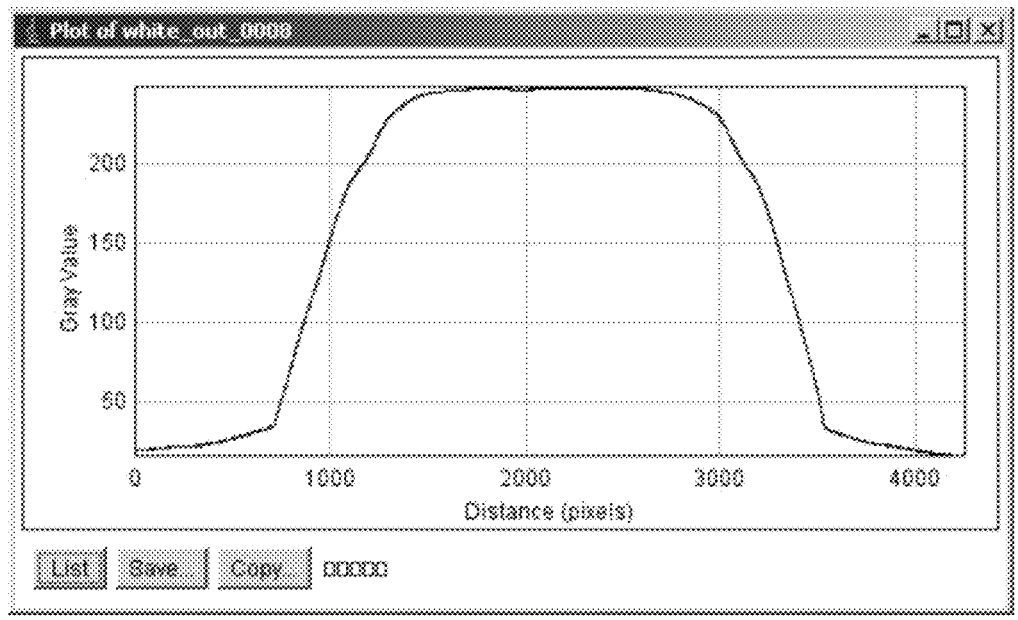
Figure 8B:
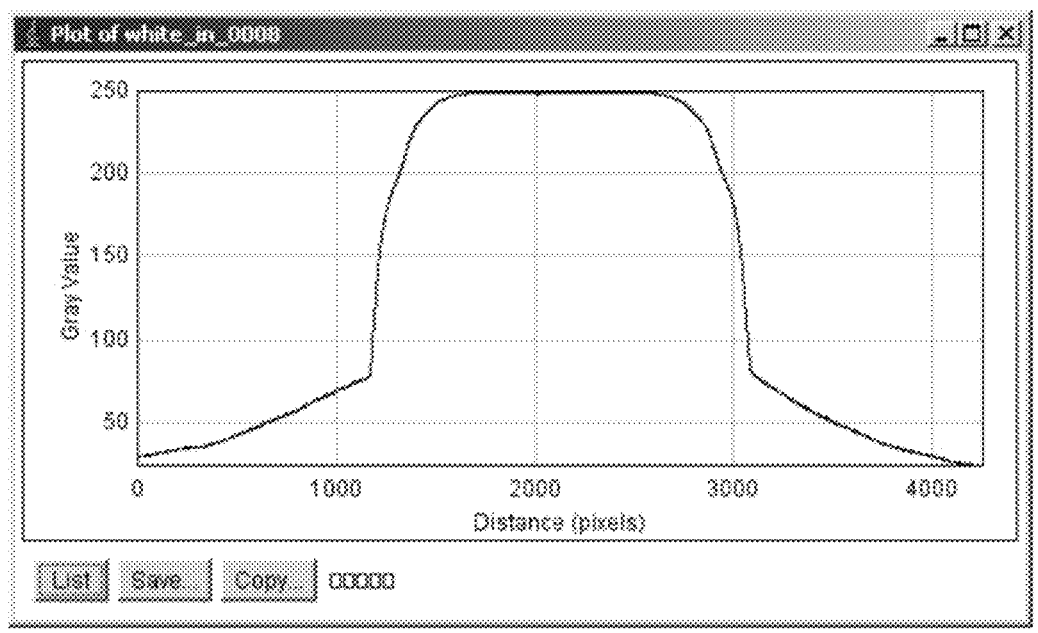

FIGS. 7A and 7B are photographs of the spot beams using two lens positions that result in a wider, and a narrower spot beam, with one embodiment of the present invention positioned at a fixed distance from a wall in an optical design that is represented by FIGS. 3A and 3B. The camera settings for both photographs are identical, and the camera distance from the wall is also held constant. As can be seen in the photographs, the wider beam is more than twice as large as the narrower beam. The LED array used in these photos consists of blue LEDs with phosphors, such that white light is emitted from each LED chip site within the array. With such an array, color mixing and color uniformity is not a concern. However, it is still desirable to have uniform light intensity within the bounds of the spot beam. In order to measure the uniformity of the spot beams shown in FIGS. 7A and 7B, the two photographs were analyzed using an open-source software program called ImageJ. FIGS. 8A and 8B provide plots of the relative brightness level of the photographs shown in FIGS. 7A and 7B, as measured along a horizontal line that passes through the center of each spot beam. In both cases, the brightness level within the approximate bounds of the spot beam is highly uniform. Note that the absolute brightness levels and scale values shown in these plots are a function of the exposure time and other camera settings used in the photographs. They should therefore only be viewed as an indication of the relative brightness and uniformity of the spot beam, across its center. As will be noted in FIGS. 8A and 8B, the relative brightness level falls off rapidly within a small number of pixels to a low value compared to the maximum value. This is caused by the aperture blocking off passage of light, so that light that is outputted from lens 307 is in directions within a cone defined by directions within an angle α from the optical axis as shown in FIG. 3B. The angle is set by several factors, including the size of the overall area occupied by the LED array, the size of the aperture 305, and the optical arrangement and intrinsic properties of lenses 302, 306, 307 such as focal length, scrambler/randomizer 303 and reflector 304 of FIG. 3. This angle may be adjusted by altering a distance between the LED array 301 on a substrate and the optical system which includes lenses 306, 307, such as by moving one of or both lenses 306, 307 along directions (shown as arrows above lenses 306, 307 in FIG. 3B) parallel to the optical axis. For the embodiment illustrated in FIGS. 4A and 4B the angle is also varied by moving one of or both lenses 406, 407 along the optical axis (shown as arrows above lenses 406, 407 in FIG. 4B). While the above description and the arrows above lenses 406, 407 in FIG. 4B indicate that these two lenses are movable to achieve the effects described above, it will be understood that it is also possible to move lens 405 either alone or synchronously with one of the two lenses 406 and 407 to achieve such effects. The 3-lens zooming system shown in FIG. 4B can produce a greater range of beam angles, and therefore a greater range of spot size and zooming/magnification, when compared to the embodiment shown in FIGS. 3A and 3B.

Figure 9:
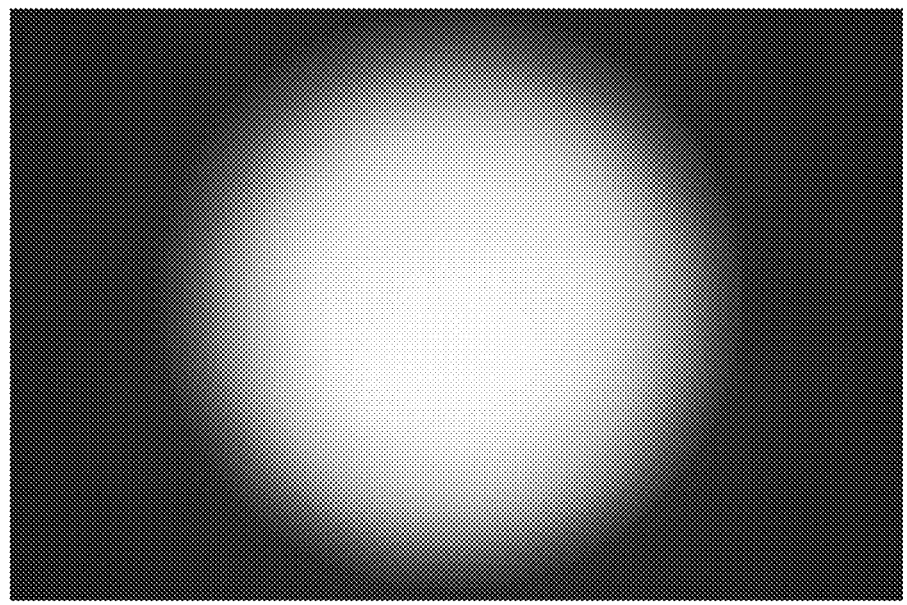
FIG. 9 shows a photograph of the spot beam provided by one embodiment of the present invention, equipped with an LED array that provides white light using red, green, and blue LEDs.

FIG. 9 shows a photograph of a spot beam produced by an embodiment of the present invention that uses an LED array composed of red, green, and blue LEDs. This form of RGB LED array can produce essentially any color, including white light of varying color temperatures, by varying the drive current that is directed to the individual colors. This in turn varies the relative mix of red, green, and blue light that is mixed within the optics of the present invention. The red, green, and blue LEDs of the LED array occupy different chip locations within the array. In order for the spot beam to have both uniform color and uniform light intensity, the optical design must provide very good color mixing. Conversely, poor color mixing will be visible as color variations within the resulting spot beam, in addition to intensity variations. Although a black and white photograph of the spot beam cannot show color variations, FIG. 9 demonstrates high uniformity of the spot beam, with the red, green, and blue LEDs all lit up.

Figure 10A:
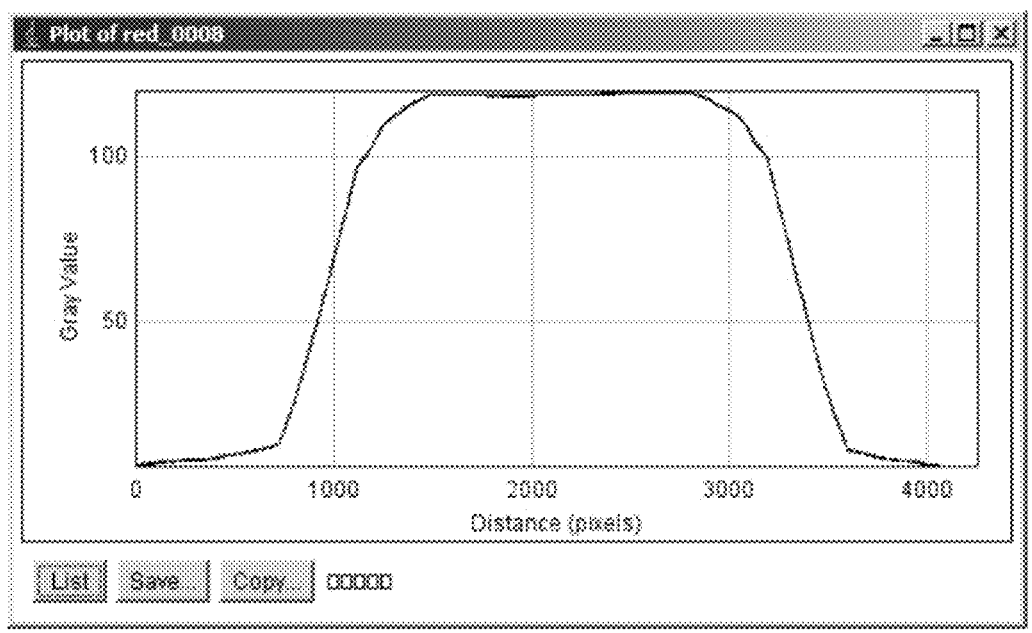
FIGS. 10A, 10B, and 10C show plots of the uniformity of the spot beam shown in FIG. 9, with each of the red, green, and blue constituent colors turned on independently.
Figure 10B:
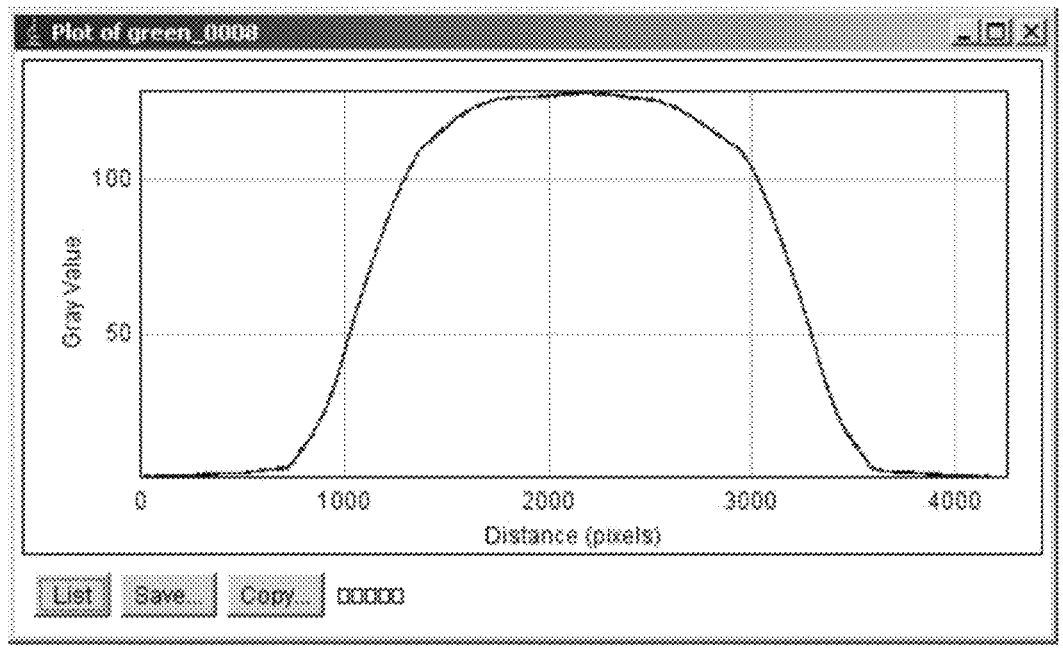
Figure 10C:
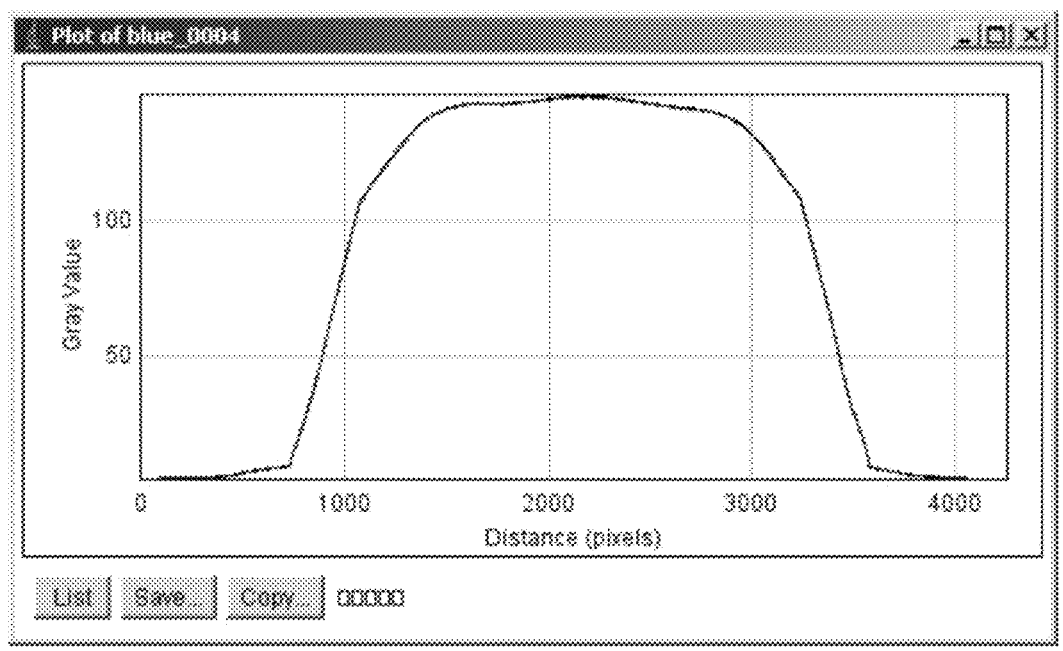

FIGS. 10A, 10B, and 10C provide relative brightness plots of the spot beam produced by an embodiment of the present invention that uses an RGB array, taken with the three colors turned on one at a time. As with FIGS. 8A and 8B, the absolute brightness levels and scale values shown in these plots are a function of the exposure time and other camera settings used in the photographs. The high uniformity seen in all three figures indicates that the relative blend of red, green, and blue light will be essentially the same at all positions within the spot beam, providing a high degree of color uniformity, as well as brightness uniformity.

Figure 11A:
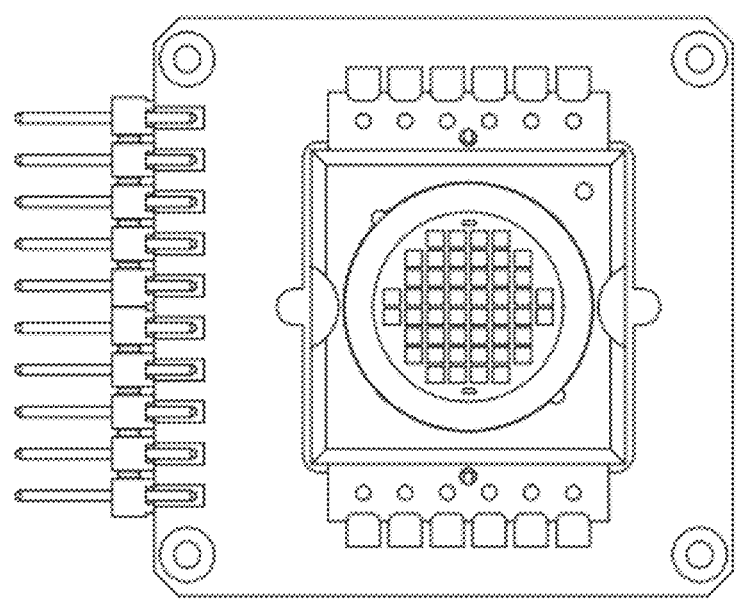
FIG. 11A is a representation of one embodiment of the densely packed multiple wavelength LED array used in the present invention, with 48 LED chips.
Figure 11B:
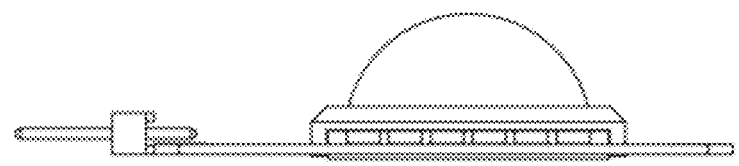
FIG. 11B shows a cross section of the densely packed multiple wavelength LED array from FIG. 11A.

FIGS. 11A and 11B provide top and side views of the LED array used in one embodiment of the present invention. The LED array shown in FIGS. 11A and 11B contains 48 LED chips, which may be a blend of red, green, or blue, or other wavelengths. The LED may also use blue LED chips that are coated with phosphors to produce white light. In this embodiment the LED chips are divided into multiple LED strings, such that the current directed to each string can be varied independently, to both adjust overall brightness, as well as the color produced by the LED array. RGB LED arrays will produce a full range or gamut of colors. It is also possible to use blue LEDs with different phosphor formulations, sometimes accompanied by small numbers of red LEDs, to provide white light with adjustable color temperature. The number of LED chips in the LED array may vary, from as few as 9 chips, to as many as 100 chips, or even more. The dimensions of each unpackaged LED chip are preferably in a range of 0.5 to 2 mm and more preferably approximately 1 mm×1 mm. The spacing between LED chips is preferably in a range of 0.05 to 0.2 mm, and more preferably approximately 0.1 mm. Depending on the number of LED chips included in the array, the diameter of the LED array's light emitting surface may range from approximately 8 to 25 mm. As shown in the side view of FIG. 11B, the LEDs of the LED array are covered by a half-ball (or truncated half-ball) lens, to provide maximum light extraction of the light emitted by the LED chips.

Figure 12:
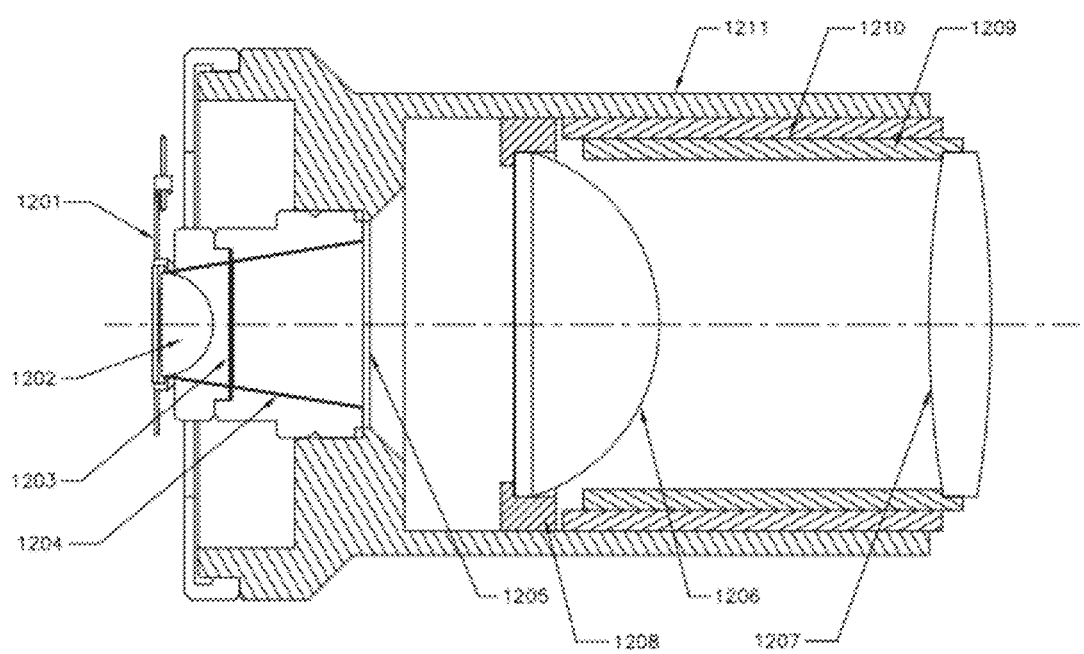
FIG. 12 is a representation of the LED array and optical elements of one embodiment of the present invention, seen in cross section.

FIG. 12 provides a cross-section view of a portion of one embodiment of the present invention, showing the major optical elements. This view corresponds to the schematic view shown in FIGS. 3A and 3B. The LED array (1201) has a half-ball lens (1202) sitting over the LED chips, as described above. The LED array with half-ball lens sits at the base of a reflector (1204), which also contains a light scrambler/homogenizer element (1203), in this case a diffuser. This reflector and diffuser serve to provide a uniform light output at the end of the reflector. An aperture (1205) sits at the end or mouth of the reflector, and passes only the most evenly-mixed central area of the beam, and also serves to define a sharp beam boundary. The plano-convex lens (1206) serves as a light collector lens, and is held in place by the lens mount 1208. In some embodiments, the position of the light collector lens can be varied, by providing some degree of fore-and-aft adjustability of the lens mount within the outer optical housing (1211). The primary adjustment of spot beam size is accomplished by moving the double-convex lens (1207), which serves as a focusing/collimating lens. In the embodiment shown in FIG. 12, the focusing lens mount (1209), and an additional zooming mechanism (1210) provide considerable range of motion, to vary the distance between the focusing lens and the collector lens.

Figure 13:
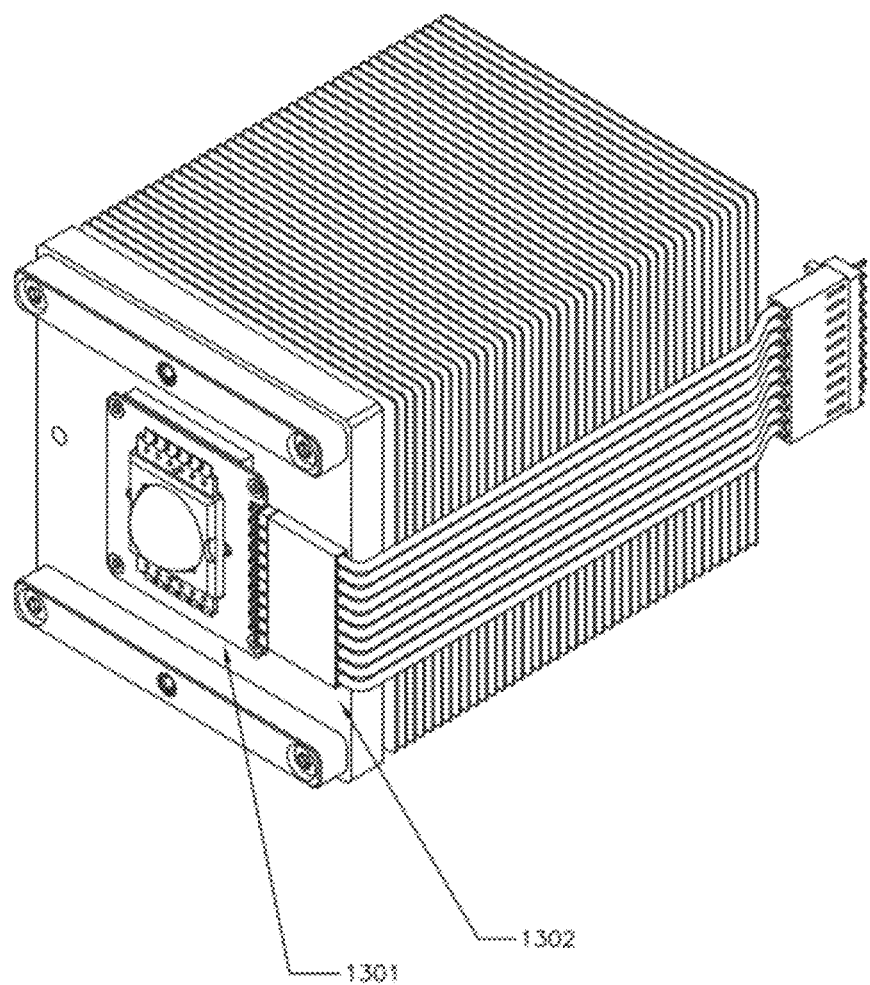
FIG. 13 shows the LED array and heat sink of one embodiment of the present invention.

Since the LED array of the present invention contains a large number of LED chips in a small area, it is important to provide good thermal extraction, via a heat sink. FIG. 13 shows the LED array (1301), with electrical ribbon cable attached. The LED array is mounted to a heat spreader plate (1302) with good thermal conduction properties, which in turn is mounted to a finned heat sink.

Figure 14A:
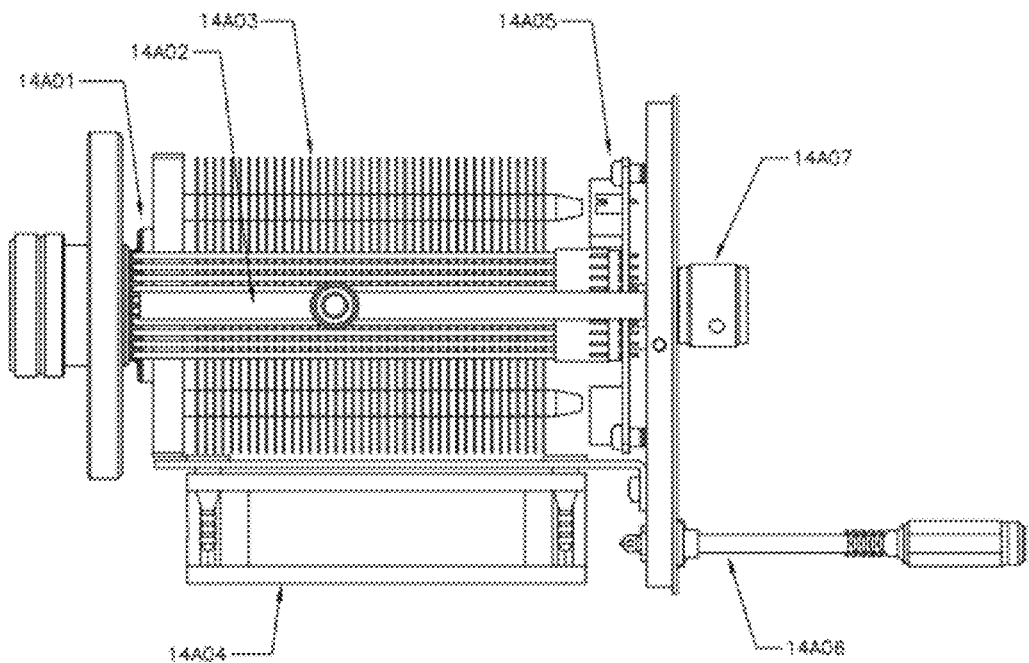
FIGS. 14A and 14B show side and bottom views of the LED array and heat sink of one embodiment of the present invention, including a cooling fan, driver board, DC power cord, and user controls.
Figure 14B:
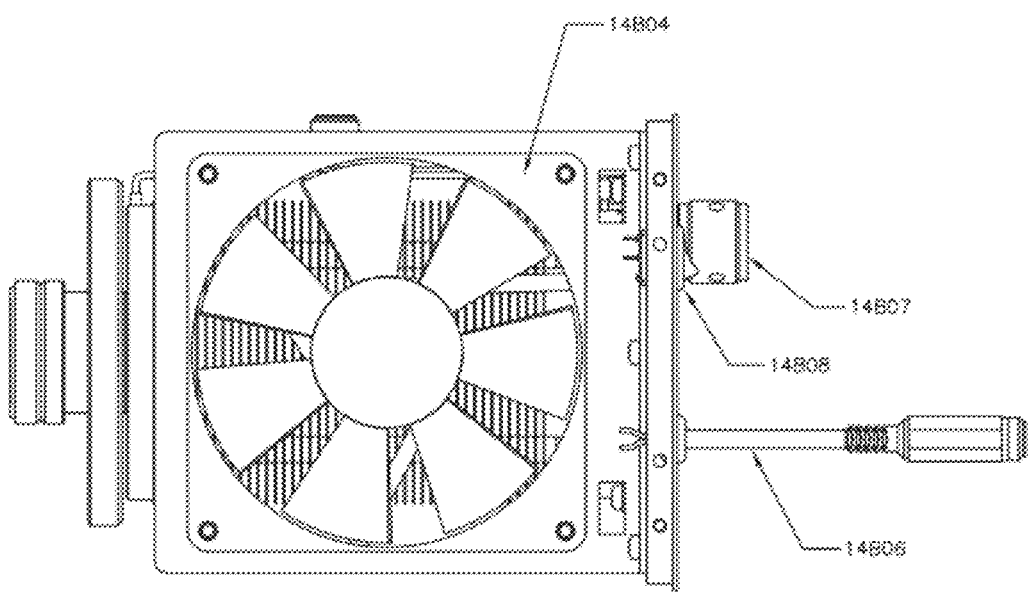
Figure 15A:
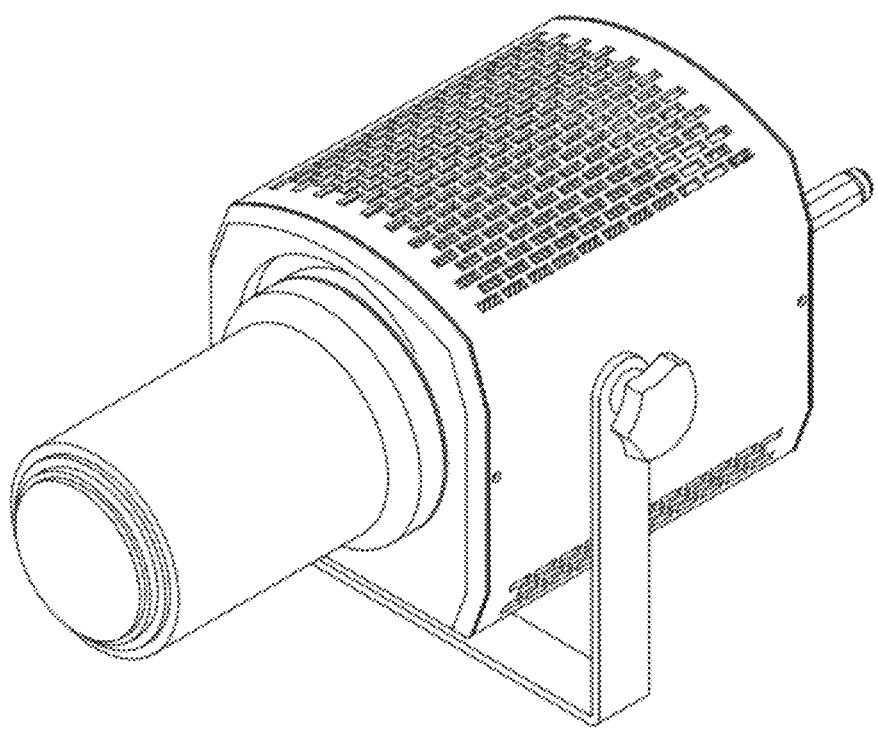
FIGS. 15A and 15B show two views of one embodiment of the present invention, in fully assembled form, showing the outer housing, a mounting bracket, and the user controls.
Figure 15B:
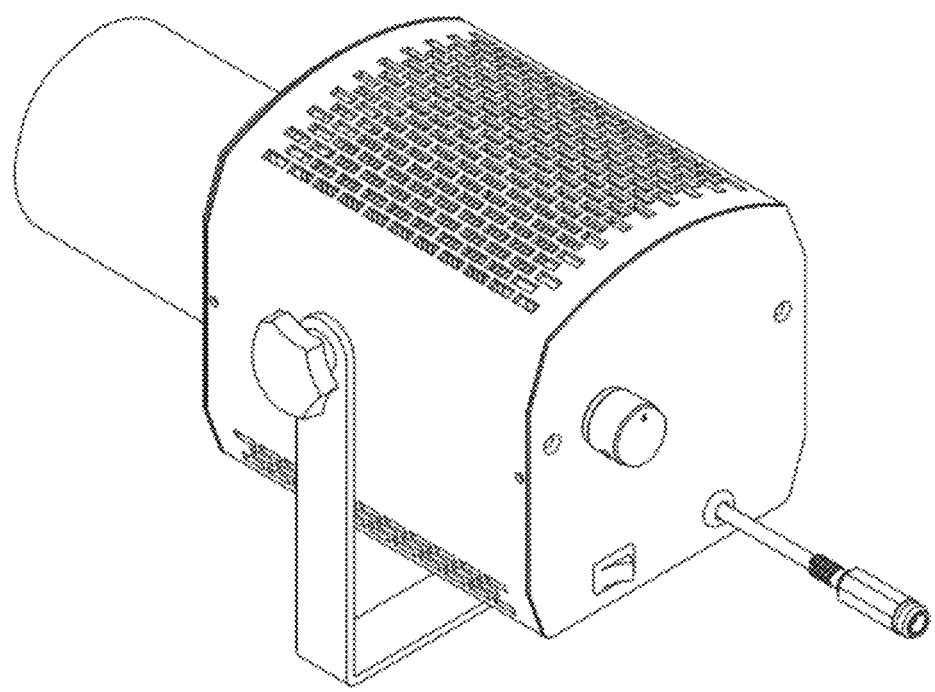

FIGS. 14A, 14B, 15A, and 15B provide additional views of the mechanical design of one embodiment of the present invention. The electrical pins at the base of the partially concealed LED array (14A01) are connected to an electrical ribbon cable (14A02), which carries the drive currents for the multiple LED strings, as provided by the electronic LED driver board (14A05). The driver board is located at the back side of the heat sink (14A03). In order to provide even more effective cooling, some embodiments of the present invention may use a cooling fan (14A04 and 14B04). The outer housing of the embodiment shown in FIGS. 14 and 15 is perforated for better air flow through the heat sink element, and also incorporates a mounting bracket, as illustrated in FIGS. 15A and 15B. Also seen in FIGS. 14A and 14B are a DC power cord and connector (14A06 and 14B06), a power on/off switch (14B08), and a single control knob (14A07 and 14B07) to control the brightness of the spot beam. The DC power cord and connector, the power on/off switch, and the brightness control knob are also visible in the view of the rear panel of the zoom spot light that is shown in FIG. 15B. In other embodiments of the present invention, other control interfaces may be used, including switches or knobs to vary the color of the light produced by the LED array, or its color temperature. It is also within the scope of the present invention to provide one or more serial data interfaces to the electronics board, so that the brightness, color, and other attributes of the spot beam may be controlled remotely, via a computer, or other form of electronic control.

Figure 16:
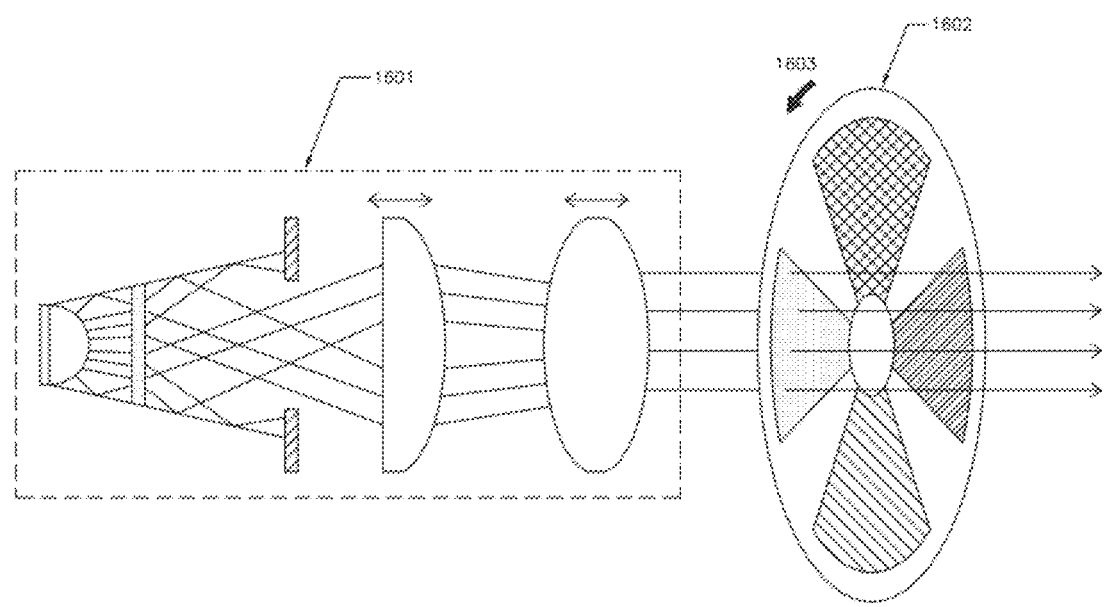
FIG. 16 shows an additional embodiment of the present invention that uses a motorized filter wheel after the representation from FIG. 3B to provide either colors, or spatial effects on the spot beam. The representation from FIG. 4B could be used as well.

Although the present invention can provide light output of multiple colors, depending on the wavelengths of the LED chips used within the LED array, it may still be desirable to use a mechanical wheel (e.g. color filter wheel) to either provide colors, or other forms of spatial light effects. In the embodiment shown in FIG. 16, a rotating wheel (1602) is placed in the path of the spot beam that emanates from the optical elements (1601). The optical elements (1601) are representative of the embodiment shown in FIG. 3. By rotating (1603) the wheel (1602), the color of the beam can be changed. Although not specifically shown in FIG. 16, such a wheel equipped with different shaped apertures can also be used to provide effects such as modified beam shapes. FIG. 16 shows the rotating wheel located at the output of the optical elements. In another embodiment, a physically smaller wheel could be used to replace the aperture element within the optics (item 305 in FIG. 3B). Such a wheel could provide selectable apertures of different sizes and shapes, to further vary the size and shape of the resulting spot beam. Different colors can also be provided in this way.

We claim:

1. A LED array spot illuminator for providing light along an optical axis to illuminate a spot, comprising:
   a substrate;
   at least one array of multiple LED chips without individual packaging supported by said substrate, wherein the LED chips emit light within different wavelength ranges and are distributed laterally with respect to said axis over a light-emitting area, said LED chips having light emitting surfaces for emitting light in directions transverse to said area, wherein the dimensions of the light-emitting area do not exceed 25 mm;
   an optical element adjacent to the light emitting surfaces of the LED chips in said at least one array and in the optical axis collecting light emitted by the LED chips;
   an optical device that collects and directs light emitted by the LED chips of the at least one array and collected by said optical element to output light illuminating the spot in directions within a cone angle from and along said axis, said optical device including one or more lenses;
   an aperture located in the optical axis between the optical element and the optical device passing the light emitted by the LED chips of the at least one array along said axis, wherein light collected by said optical element and said optical device and passed by the aperture forms a beam of light illuminating the spot, defining a boundary for and shape of the spot;
   a diffusing/scattering/homogenizing element located in a path of the beam between the at least one array of multiple LED chips and the aperture so that the beam illuminating the spot is substantially spectrally uniform, across the illuminated spot; and
   an instrument for adjusting a distance between the optical element and at least one of the one or more lenses to adjust said cone angle, to select the size of the illuminated spot, and to define a sharp boundary for the spot.

2. The illuminator of claim 1, wherein the light-emitting area of the array of LED chips is substantially circular in shape.

3. The illuminator of claim 1, wherein the illuminated spot is substantially uniform in intensity across the illuminated spot.

4. The illuminator of claim 1, said optical device comprising a first collector lens for collecting light from the optical element and a second lens focusing or collimating light from the collector lens to form the beam directed to the illuminated spot.

5. The illuminator of claim 4, wherein a distance between the substrate and the second lens is in a range of about 6 to 12 inches.

6. The illuminator of claim 1, said optical device comprising three lenses forming a zoom system, wherein said aperture is located at an object plane of a first lens of the three lenses that is closest to the aperture.

7. The illuminator of claim 6, said instrument adjusting one or more distances between the first lens and the remaining two of the three lenses to alter the effective focal length of the zoom system and the cone angle.

8. The illuminator of claim 7, the instrument adjusting the one or more distances between the remaining two of the three lenses and the first lens synchronously, or a position of only one of the remaining two of the three lenses relative to the light emitting surfaces of the LED chips.

9. The illuminator of claim 1, further comprising an index matching material between the light emitting surfaces of the LED chips in said at least one array and the optical element.

10. The illuminator of claim 1, the LED chips emitting light within the different wavelength ranges emit light at substantially uniform brightness levels across the spot.

11. The illuminator of claim 1, wherein the optical element comprises a half-ball lens.

12. The illuminator of claim 1, further comprising a reflective surface located between the optical element and the aperture reflecting light emitted by the plurality of LED chips towards the aperture, wherein the aperture passes only a central portion of the beam from the LED chips and the reflector to enhance spectral uniformity of the beam at the spot.

13. The illuminator of claim 1, wherein said at least one array of multiple LED chips comprises multiple strings of LED chips, each string emitting light in a wavelength range different from the wavelength range of light emitted by a different string in the at least one array.

14. The illuminator of claim 13, wherein a spacing between adjacent LED chips in said at least one array is about 0.1 mm.

15. The illuminator of claim 1, further comprising an electronic control circuit for supplying separate electric currents to the multiple strings of LED chips, and at least one interface for receiving computer or user commands for controlling the electric currents supplied by the circuit to control light emission by the multiple LED chips, for varying either the color or color temperature of the substantially spectrally uniform illuminated spot, as well as the overall intensity of the spot.

16. The illuminator of claim 1, further comprising a heat sink in thermal communication with the multiple LED chips.

17. The illuminator of claim 1, wherein a spacing between adjacent LED chips in said at least one array is in a range of about 0.05 to 0.2 mm.

18. The illuminator of claim 1, wherein the multiple LED chips without individual packaging in said at least one array have dimensions in a range of about 0.5 to 2 mm.

19. The illuminator of claim 18, wherein the multiple LED chips without individual packaging in said at least one array have dimensions of about 1 mm by 1 mm.

20. The illuminator of claim 1, wherein light of substantially uniform brightness is provided within said cone angle set by factors including size of said aperture and an optical arrangement including said optical element.

21. The illuminator of claim 1, wherein the diffusing/scattering/homogenizing element is located at or near an object plane of the optical device.

22. The illuminator of claim 1, wherein the array contains at least 9 LED chips and the LED chips of the array are arranged to occupy an area substantially circular in shape with a diameter from approximately 8 to 25 mm.

23. The illuminator of claim 1, further comprising phosphor on some or all of the LED chips.

24. The illuminator of claim 1, said array including LED chips that emit red, blue and green light, so that the LED chips emit mixed/blended light of any color, including white light of varying color temperatures.

25. The illuminator of claim 1, wherein a shape of the aperture is chosen to define the shape of the illuminated spot.

26. The illuminator of claim 1, further comprising a rotatable wheel with filter(s) or different shaped apertures for selecting a color or shape or size of the beam of light.

27. The illuminator of claim 1, said different wavelength ranges including red, blue and green wavelengths, and wherein the relative blend of red, blue and green wavelengths is substantially the same within the beam of light.

28. The illuminator of claim 1, wherein the relative blend of the different wavelengths is substantially the same within the beam of light.

29. A method for providing light that forms a beam along an optical axis for illuminating a spot, comprising:
   providing a LED array illuminator that includes a substrate, at least one array of multiple LED chips without individual packaging supported by said substrate, wherein the LED chips emit light within different wavelength ranges and are distributed laterally with respect to said axis, said at least one array occupying a light-emitting area whose dimensions do not exceed 25 mm;
   supplying electric current to the multiple LED chips, causing them to emit light;
   collecting light emitted by the LED chips using an optical element adjacent to the light emitting surfaces of the LED chips in said at least one array;
   passing the collected light emitted by the multiple LED chips through an aperture;
   passing light emitted by the multiple LED chips to an optical device, so that light emitted by the multiple LED chips that passed through the optical device and the aperture are in directions within a cone angle from and along said axis, forming a beam of light illuminating a the spot and defining a boundary for and shape of the spot;
   causing light in the beam to be modified before the beam passes through the aperture by a diffusing/scattering/homogenizing element so that the beam illuminating the spot is substantially spectrally uniform across the illuminated spot; and
   controlling a distance between the optical element and one or more elements of the optical device to adjust said cone angle, to select a size of the spot and to define a sharp boundary for-the spot.

30. The method of claim 29, said different wavelength ranges including red, blue and green wavelengths, and wherein the relative blend of red, blue and green wavelengths is substantially the same within the beam of light.

31. The method of claim 29, wherein the relative blend of the different wavelengths is substantially the same within the beam of light.

* * * * *